United States Patent
Brown et al.

(10) Patent No.: US 7,805,927 B2
(45) Date of Patent: Oct. 5, 2010

(54) DIESEL ENGINE DISPLACEMENT ON DEMAND

(75) Inventors: David B. Brown, Brighton, MI (US); Arjun D. Tuteja, Novi, MI (US)

(73) Assignee: GM Global Technology Operations, Inc.

( * ) Notice: Subject to any disclaimer, the term of this patent is extended or adjusted under 35 U.S.C. 154(b) by 128 days.

(21) Appl. No.: 10/463,167

(22) Filed: Jun. 17, 2003

(65) Prior Publication Data

US 2004/0255576 A1    Dec. 23, 2004

(51) Int. Cl.
*F01N 3/00*    (2006.01)

(52) U.S. Cl. .............................. 60/285; 60/274; 60/276; 123/198 F; 123/481

(58) Field of Classification Search .................. 60/274, 60/284, 285, 299, 300, 276, 295, 297, 311; 123/198 F, 481

See application file for complete search history.

(56) References Cited

U.S. PATENT DOCUMENTS

| | | | | |
|---|---|---|---|---|
| 4,165,610 A | * | 8/1979 | Iizuka et al. | 60/284 |
| 4,201,180 A | * | 5/1980 | Iizuka | 123/672 |
| 4,211,075 A | * | 7/1980 | Ludecke et al. | 60/285 |
| 4,245,471 A | * | 1/1981 | Sugasawa et al. | 60/276 |
| 4,337,740 A | * | 7/1982 | Sugasawa et al. | 123/672 |
| 4,354,471 A | * | 10/1982 | Sugasawa et al. | 123/481 |
| 4,391,240 A | * | 7/1983 | Sugasawa et al. | 123/672 |
| 4,395,875 A | * | 8/1983 | Virk | 60/274 |
| 4,404,796 A | * | 9/1983 | Wade | 60/274 |
| 4,467,602 A | * | 8/1984 | Iizuka et al. | 60/276 |
| 6,553,959 B2 | * | 4/2003 | Xu et al. | 123/295 |
| 6,668,546 B2 | * | 12/2003 | Hayman et al. | 60/284 |
| 6,904,752 B2 | * | 6/2005 | Foster et al. | 60/295 |
| 6,907,725 B2 | * | 6/2005 | Szymkowicz et al. | 60/285 |
| 2003/0121249 A1 | * | 7/2003 | Foster et al. | 60/285 |
| 2004/0016425 A1 | * | 1/2004 | Ma | 123/676 |

FOREIGN PATENT DOCUMENTS

| | | |
|---|---|---|
| DE | 4445779 A1 | 6/1996 |
| WO | WO03/048548 A1 | 6/2003 |

* cited by examiner

*Primary Examiner*—Thomas E Denion
*Assistant Examiner*—Diem Tran

(57) ABSTRACT

An exhaust temperature control system for a displacement on demand (DOD) diesel engine includes a first and a second cylinder and an air intake that selectively enables air flow into the first cylinder. A fuel injector selectively enables fuel flow into the first cylinder. A controller increases an exhaust temperature of the diesel engine by closing the air intake and disabling fuel flow through the fuel injector to deactivate the first cylinder.

10 Claims, 2 Drawing Sheets

DIESEL ENGINE DISPLACEMENT ON DEMAND

FIELD OF THE INVENTION

The present invention relates to diesel engines, and more particularly to improved exhaust temperature control for displacement on demand diesel engines.

BACKGROUND OF THE INVENTION

During the combustion process, fuel is oxidized, and hydrogen (H) and carbon (C) combine with air. Various chemical compounds are formed including carbon dioxide ($CO_2$), water ($H_2O$), carbon monoxide (CO), nitrogen oxides ($NO_x$), unburned hydrocarbons (HC), sulfur oxides ($SO_x$), and other compounds. Automobile exhaust systems include an exhaust treatment device, such as a three-way catalytic converter, that reduces CO, HC and $NO_x$ in the exhaust gas. The exhaust treatment device must be heated to a sufficient temperature for optimum performance.

Diesel engines have improved thermal efficiency as compared to gasoline engines. As a result, the exhaust temperature of a diesel engine is lower than that of a gasoline engine. The exhaust provides heat that is used to warm the exhaust treatment device. Because the exhaust temperatures of diesel engines are lower than that of gasoline engines, the diesel exhaust does not consistently heat the exhaust treatment device to desired operating temperatures.

SUMMARY OF THE INVENTION

The present invention provides an exhaust temperature control system for a displacement on demand (DOD) diesel engine. The control system includes first and second cylinders and an air intake that selectively enables air flow into the first cylinder. A fuel injector selectively enables fuel flow into the first cylinder. A controller increases exhaust temperature of the diesel engine by closing the air intake and disabling fuel flow through the fuel injector to deactivate the first cylinder.

In one feature, the controller increases fuel flow to the second cylinder to maintain torque output of the diesel engine.

In another feature, an intake valve is disposed within the air intake to selectively enable air flow through the air intake.

In still another feature, the air intake is only partially closed to enable a reduced air flow into the first cylinder.

In yet another feature, the fuel injector is electronically controlled to cease fuel injection into the first cylinder.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
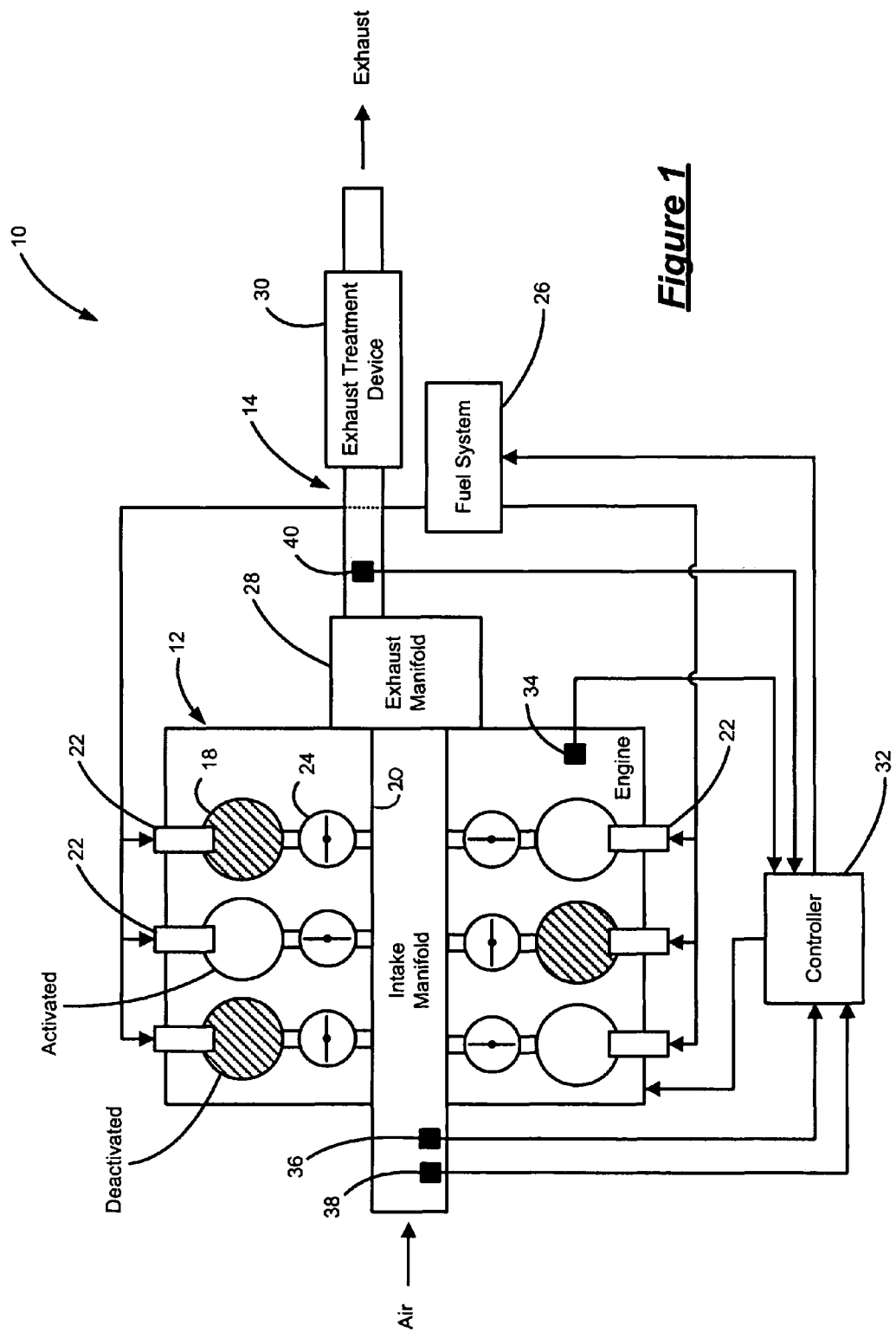
FIG. 1 is a functional block diagram of a displacement on demand (DOD) diesel engine.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active).

Referring now to FIG. 1, a vehicle 10 includes a diesel engine 12 that outputs exhaust gases to an exhaust system 14. The engine 12 includes N cylinders 18. One or more of the cylinders 18 are selectively deactivated during engine operation. Although FIG. 1 depicts six cylinders (N=6), it can be appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. Accessories (not shown) such as a hydraulic pump, HVAC compressor, and/or alternator are driven by the engine 12.

The engine 12 includes fuel injectors 22 and valves 24 associated with each cylinder 18. In a closed position, the valves 24 inhibit air flow from the intake manifold 20 into the associated cylinders 18. In an open position, the valves 24 enable air flow from the intake manifold 20 into the associated cylinder 18. The fuel injectors 22 communicate with a fuel supply system 26. The fuel injectors 26 are selectively operated to inject a quantity of fuel into the respective cylinders 18. Air and fuel are combined in the cylinders 18 and are combusted to produce driving power.

The exhaust system 14 includes an exhaust manifold 28 and an exhaust treatment device 30. The combustion gases from each cylinder 18 flow to the exhaust manifold 28 and through the exhaust treatment device 30 to atmosphere. The exhaust treatment device 30 can be a filter, an oxidization catalytic converter, an $NO_x$ catalytic converter or another type of exhaust treatment device 30 known in the art. The exhaust treatment device 30 reduces exhaust emissions to desired levels. For optimum efficiency, the exhaust treatment device 30 operates above a threshold temperature. The exhausted combustion gases heat the exhaust treatment device 30.

A controller 32 communicates with the engine 12 and various sensors discussed herein. More particularly, the controller 32 outputs control signals to the engine 12 to control operating modes of the engine. An engine speed sensor 34 generates a signal based on engine speed. An intake manifold temperature sensor 36 generates a signal based on intake manifold temperature. An intake manifold pressure sensor 38 generates a signal based on a vacuum pressure of the intake manifold 20. An exhaust temperature sensor 40 generates a signal based on exhaust temperature. The controller 32 communicates with the fuel system 26 and the valves 24.

The diesel engine 12 has improved thermal efficiency over gasoline engines. Thus, the exhaust temperature of the diesel engine 12 is lower than that of gasoline engines. As a result, the exhaust temperature is not always sufficient to heat the exhaust treatment device 30. According to the present invention, the controller 32 selectively deactivates cylinders 18 to increase the exhaust temperature of the diesel engine 12.

Deactivation can only occur during periods of light engine load to ensure that the cylinders 18 that remain active produce sufficient driving torque. The controller 32 determines the engine load based on the signals of the various sensors. If the exhaust temperature is below the threshold and the engine load is sufficiently light, the controller 32 deactivates a number of cylinders 18 and increases the torque output of the active cylinders 18 by increasing fuel supplied thereto. As a result, the exhaust temperature of the active cylinders 18 is increased. Cylinder deactivation is achieved by the controller sending output signals that direct the engine 12 to close particular intake valves 24 and cease fueling through particular fuel injectors 22.

Figure 2:
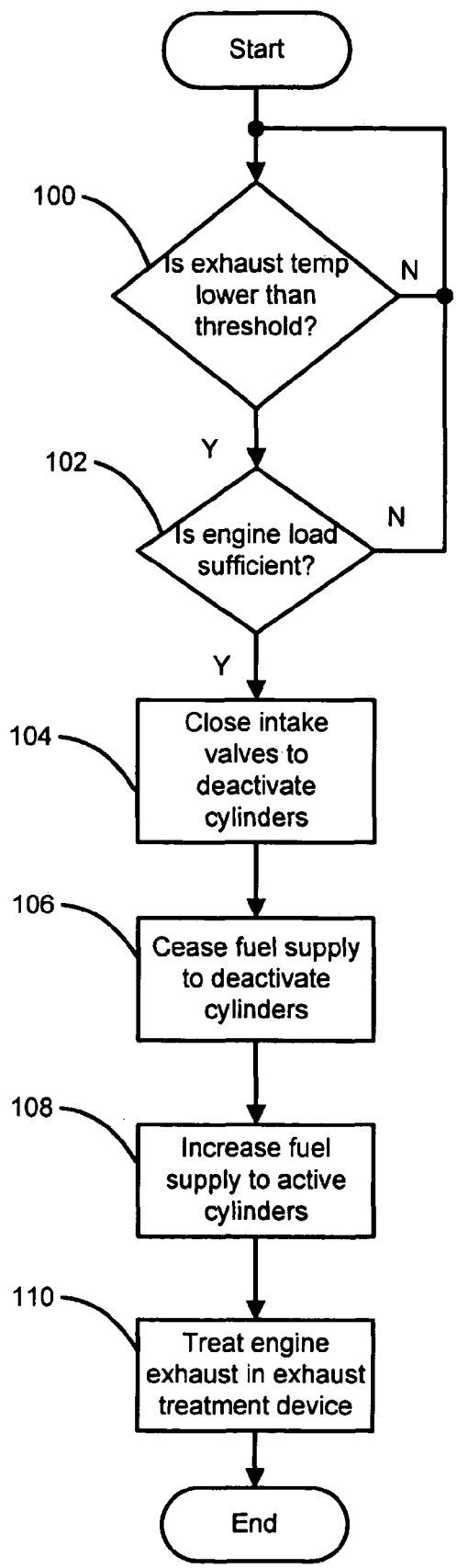
FIG. 2 is a flowchart illustrating an exhaust temperature control for the (DOD) diesel engine according to the present invention.

Referring now to FIG. 2, the exhaust temperature control of the present invention is described in detail. In step 100, control determines whether the exhaust temperature is less than the threshold temperature. If not, control loops back. Otherwise control continues in step 102. In step 102, control determines whether the engine load is sufficiently light for cylinder deactivation. If not, control loops back. Otherwise, control continues in step 104.

Control deactivates the selected cylinders 18 by closing the associated intake valves 24 and ceasing fuel supply to the selected cylinders 18 in steps 104 and 106, respectively. In step 108, control increases the fuel supply to the active cylinders 18. The increased fuel provides an a lower air-to-fuel ratio within the cylinders 18 resulting in increased exhaust temperature. The exhaust subsequently heats the exhaust treatment device 30 to a sufficient temperature to enable treatment within the exhaust treatment device in step 110.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. An exhaust temperature control system for a displacement on demand (DOD) diesel engine, comprising:
   a first and a second cylinder;
   an air intake including respective valves disposed upstream of said first and second cylinders and that are each moveable between a closed position and an open position to selectively enable air flow into said first and second cylinders, respectively;
   a fuel injector that selectively enables fuel flow into one of said first and second cylinders;
   a temperature sensor that is responsive to an exhaust temperature and generates a temperature signal based thereon; and
   a controller that determines an engine load and increases an exhaust temperature of said diesel engine by increasing fuel flow to continue to activate said second cylinder as well as closing said air intake and disabling fuel flow through said fuel injector to deactivate said first cylinder based on said temperature signal when said engine load is below a predetermined engine load.

2. The exhaust temperature control system of claim 1 wherein said controller increases fuel flow to said second cylinder to maintain torque output of said diesel engine.

3. The exhaust temperature control system of claim 1 wherein said air intake is only partially closed to enable a reduced air flow into said one of said first and second cylinders.

4. The exhaust temperature control system of claim 1 wherein said fuel injector is electronically controlled to cease fuel injection into said one of said first and second cylinders.

5. A method of increasing exhaust temperature of a diesel engine comprising:
   operating said diesel engine including first and second cylinders;
   closing an air intake of one of said first and second cylinders by moving one of a first valve and a second valve that is disposed upstream of a respective one of said first and second cylinders to a closed position from an open position;
   shutting off fuel supply to said one of said first and second cylinders to deactivate said one of said first and second cylinders;
   determining an engine load;
   generating an exhaust temperature signal; and
   increasing fuel supply to an activated one of said first and second cylinders to increase said exhaust temperature based on said exhaust temperature signal and said engine load.

6. The method of claim 5 wherein said step of increasing fuel supply includes maintaining a torque output of said diesel engine.

7. The method of claim 5 wherein said step of shutting off fuel supply to said one of said first and second cylinders comprises electronically controlling a fuel injector to cease fuel injection into said one of said first and second cylinders.

8. The method of claim 5 wherein said air intake is partially closed to enable a reduced air flow into said first cylinder.

9. A method of treating emissions of a displacement on demand (DOD) diesel engine comprising:
   generating an exhaust temperature signal;
   determining an engine load;
   deactivating one of a first and second cylinder by moving one of a first and second valve that is disposed upstream of said one of said first and second cylinders, respectively, to a closed position from an open position to inhibit air flow into said one of said first and second cylinders and increasing fuel supply to remaining cylinders to increase a temperature of said emissions based on said exhaust temperature signal and said engine load; and
   treating said emissions in a catalytic converter.

10. The method of claim 9 further comprising shutting off fuel supply to said one of said first and second cylinders by electronically controlling a fuel injector to cease fuel injection into said one of said first and second cylinders.

* * * * *